United States Patent [19]

Goscenski, Jr.

[11] 4,373,482
[45] Feb. 15, 1983

[54] FLEXIBLE SHAFT FAN DRIVE

[75] Inventor: Edward J. Goscenski, Jr., Battle Creek, Mich.

[73] Assignee: Eaton Corporation, Cleveland, Ohio

[21] Appl. No.: 230,844

[22] Filed: Feb. 2, 1981

[51] Int. Cl.[3] ............................................. F02B 77/00
[52] U.S. Cl. .............................. 123/198 R; 123/41.65; 123/195 A; 464/182
[58] Field of Search ............ 123/198 R, 195 A, 41.11, 123/41.63, 41.65; 464/179, 182

[56] References Cited

U.S. PATENT DOCUMENTS

| | | | |
|---|---|---|---|
| 1,636,038 | 7/1927 | Bolozky et al. | 474/118 |
| 1,658,166 | 2/1928 | Jackson | 123/41.65 |
| 3,613,645 | 10/1971 | Froumajou | 123/41.46 |
| 4,040,272 | 8/1977 | Boyd | 64/26 |

OTHER PUBLICATIONS

Pennwalt Corporation, S. S. White Industrial Products Division Booklet "Rotary Motion Flexible Shafts" Technical Data, Copyright 1977.
Pennwalt Corporation, S. S. White Industrial Products Division Booklet "Rotary Motion Flexible Shafts" Applications, Copyright 1977.

Primary Examiner—Ira S. Lazarus
Attorney, Agent, or Firm—Charles H. Grace; Leslie J. Kasper; John W. Yakimow

[57] ABSTRACT

A flexible shaft (42) driven by a transversely mounted engine (18) of an automobile (10) and extending rearwardly of the axis (48—48) of the crankshaft of the engine a distance transverse to the longitudinal axis of the vehicle and then curving and extending longitudinally forwardly to the cooling fan (32) used to draw air through the radiator (28) of the vehicle. The engine (18) is mounted in a front wheel drive vehicle (10) and has a pulley (36) mounted on the forward end of the engine driven via a belt (38) from a pulley (40) on the crankshaft of the engine. The pulley (36) in turn rotates the core (54) of the flexible shaft (42) which in turn rotates a shaft (64) used to drive the cooling fan (32) mounted juxtaposition the radiator (28). Means (58,60) secure the shaft at each end respectively to the rear end of the pulley (36) and the cooling fan (32). A gentle sweeping curve is provided from the transverse extending portion of shaft (42) to the longitudinally extending portion. One end of shaft (42) may be driven via an accessory of engine (18), such as the alternator (178), while the other end may drive fan (132) through a gear box (180).

8 Claims, 5 Drawing Figures

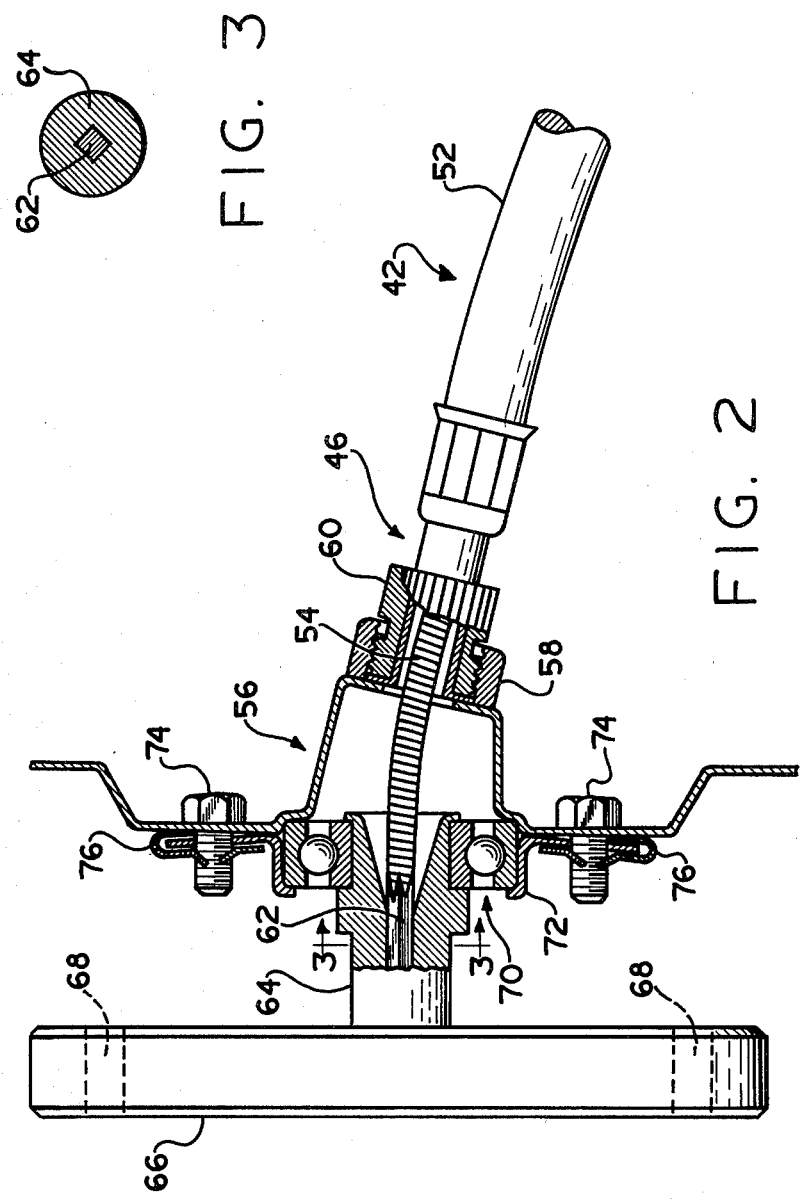

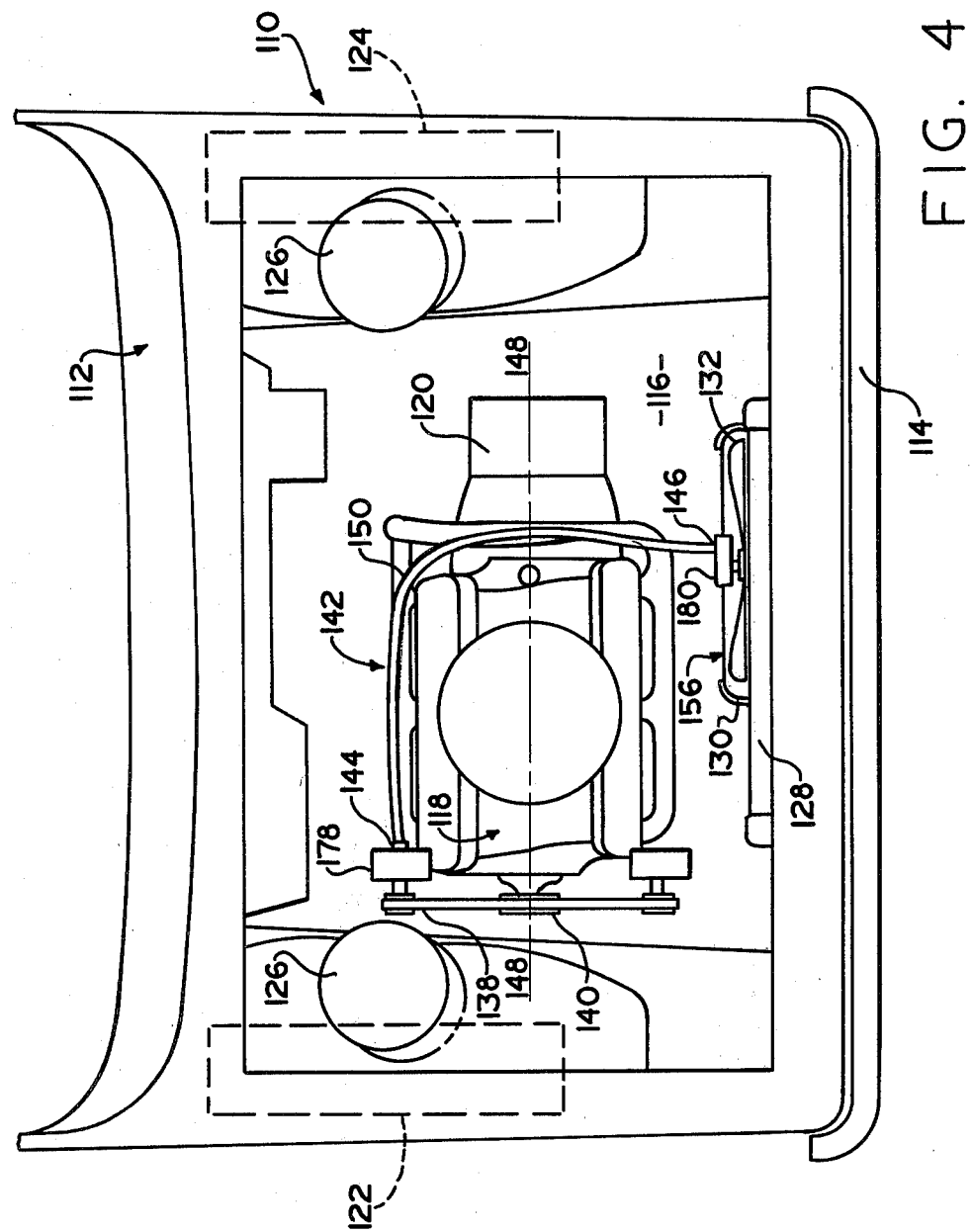

FLEXIBLE SHAFT FAN DRIVE

BACKGROUND OF THE DISCLOSURE

The present invention relates to a flexible drive for rotating a cooling fan located in a vehicle having a transverse mounted engine.

In most road vehicles, a radiator is located in a plane traversing the longitudinal axis of the vehicle. A propeller type fan driven by the engine is used to draw cooling air through the radiator. When the engine of the vehicle is mounted traverse to the longitudinal axis of the vehicle, difficulties are encountered in driving the fan. In most transverse engine applications, electric motors are used to drive the cooling fan. The electric motors are, however, power limited due to the available space and the amount of electrical energy available in the vehicle. It has been proposed in the past to use a right angle drive constructed out of belts, shafts, and beveled gears, as shown in U.S. Pat. Nos. 1,658,166 and 3,613,645, to drive the cooling fan. Such an arrangement, however, is complex and expensive. It has also been proposed by the assignee of this application in U.S. Pat. No. 4,040,272 to use a flexible shaft to drive the cooling fan. The disadvantage of the flexible shaft arrangement illustrated in this patent lies in the difficulty and loss of efficiency in locating the flexible shaft in the engine compartment.

It is, accordingly, an object of the present invention to provide an inexpensive and simple drive for the cooling fan of a vehicle having a transverse mounted engine.

It is another object of the invention to provide an efficient and inexpensive drive for transmitting the required horsepower to the cooling fan of a vehicle having a transverse mounted engine.

It is a more specific object of the invention to use a flexible shaft to accomplish the foregoing objects.

FIG. 2 is an enlarged side elevational view, partly in section, illustrating the mounting of one end of the flexible shaft to drive the cooling fan.

FIG. 3 is a sectional view taken on line 3—3 of FIG. 2.

FIG. 4 is similar to FIG. 1 and illustrates another embodiment of the invention.

DESCRIPTION OF THE PREFERRED EMBODIMENTS

Figure 1:
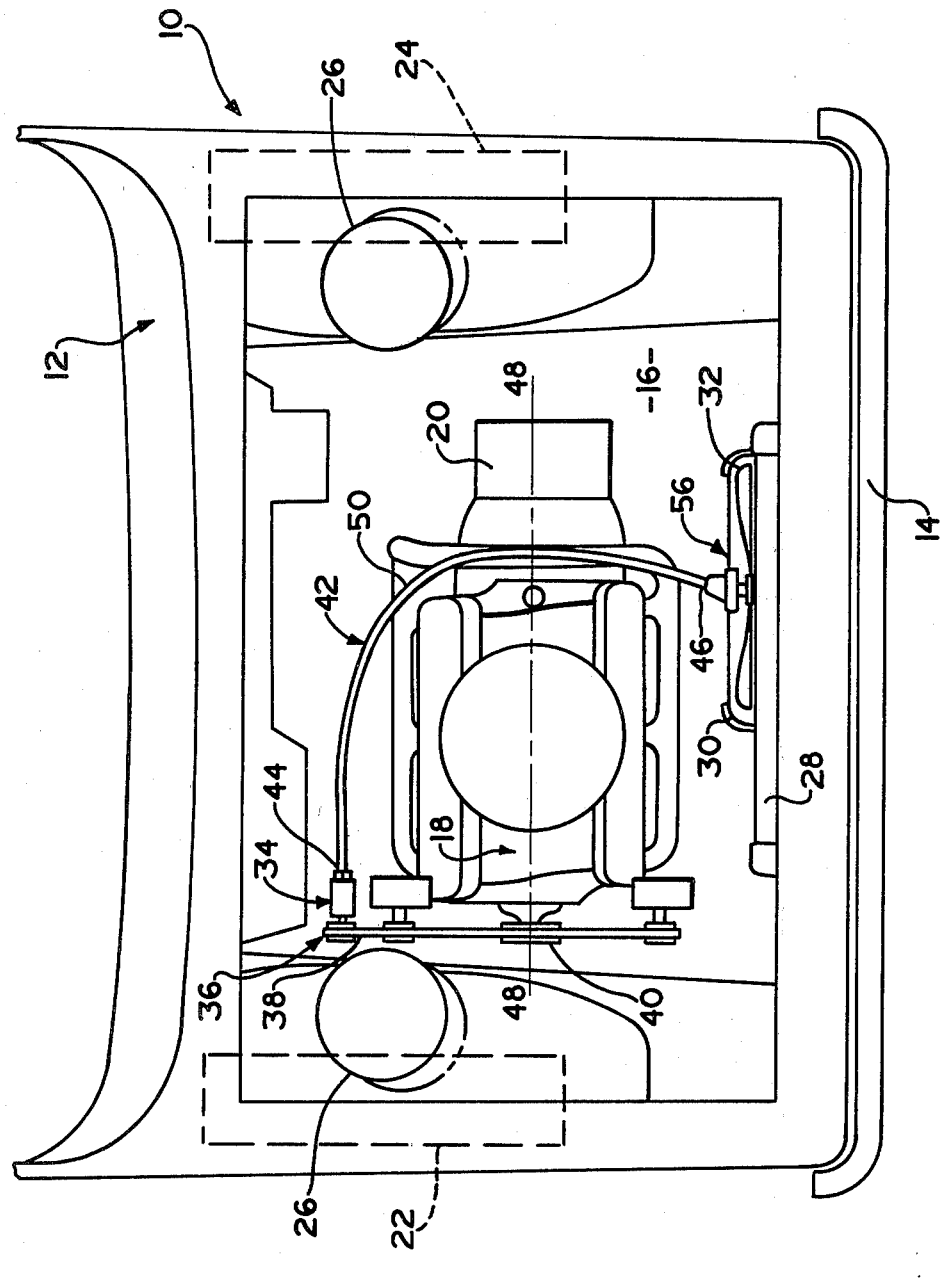
FIG. 1 is a top plan view of the front end of an automobile having a transverse mounted engine and illustrating an embodiment of the invention.

FIG. 1 is a fragmentary, top plan view of an automobile 10 illustrated from a portion of the windshield 12 forwardly to the bumper 14. The engine compartment 16 includes an engine 18, illustrated as a V-6 internal combustion engine, connected to a transmission 20. The crankshaft of engine 18 is located transverse to the longitudinally extending axis of vehicle 10. Appropriate drive connection means are provided to transmit power from transmission 20 to front wheels 22 and 24. The wheels and automobile body are supported relative to one another by suspension means 26.

Engine 18 is water cooled and requires a radiator 28 which is mounted forwardly of engine 18 in compartment 16. Radiator 28 is located transverse to the longitudinal axis of vehicle 10 and includes appropriate means for communicating liquid coolant to and from engine 18. A shroud 30 is supported in a known manner relative to radiator 28 and is designed to enclose a cooling fan 32 used to draw air longitudinally across radiator 28 relative to the longitudinal axis of vehicle 10. The forward portion of engine 18 includes a series of belts and pulleys used to drive miscellaneous accessories, such as, a power steering pump, an alternator, an air pump, an air conditioning compressor and/or a vacuum pump. To this point, what has been described is relatively standard to arrangements currently found in production vehicles.

A jack shaft 34 is mounted relative to engine 18 and includes a pulley 36 having a forward portion facing wheel 22 and a rearward portion facing engine 18. A belt 38 connected to pulley 40 mounted on the engine's crankshaft is used to rotate pulley 36. A flexible shaft 42 has one end 44 secured to the rearward portion of pulley 36 and its other end 46 secured to fan 32. Flexible shaft 42 extends a distance from pulley 36 at a location rearwardly of the crankshaft axis 48—48 along a line traverse to the longitudinal axis of vehicle 10 and then bends along a curve 50 and extends a distance toward said fan 32 in a direction generally following the longitudinal axis of vehicle 10. The flexible shaft is located to transmit rotational motion from pulley 36 to fan 32 without unnecessary binding of the shaft's components.

As illustrated in FIG. 2, shaft 42 includes an outer tubular casing 52 which encircles an inner core 54 formed by a plurality of wound wires. One such shaft which finds particular applicability to the disclosed arrangement is that manufactured by Penwalt Corporation, S. S. White Industrial Products Division, N.J., U.S.A., having a 0.445" OD casing 52 (part number 312-15690-Y) made of metal and a 0.250" OD core 54 made of four layers of high tensile steel wire with opposed windings of successive layers (part number 250L9).

Shroud 30 includes a bracket 56 which has an annular extending portion which includes a threaded mounting member 58. A threaded member 60 secured to tubular portion 52 of flexible shaft 42 is threadedly engaged with member 58 and retains the flexible shaft 42 relative to bracket 56. S. S. White ferrule part number 311-12471X may be used for member 60 and its counterparts at pulley 36 at end 44. Core 54 terminates at an end 62 which is square in cross sectional configuration (FIG. 3). End 62 fits within a corresponding square opening in a shaft 64. A similar arrangement is used to transmit rotation of pulley 36 to core 54 at end 44. Shaft 64 includes an outer flange portion 66. Flange portion 66 includes a plurality of openings 68 in which may be mounted cooling fan 32, or if desired, a viscous fluid coupling or the like to drive cooling fan 32. An antifriction bearing 70 is supported in bracket 56 via portion 72 and a plurality of bolts and fasteners 74 and 76.

As illustrated and contemplated by this invention, rotation of pulley 36 will result in the rotation of core 54 within tubular casing 52 to rotate shaft 64 and thereby rotate fan 32 secured to flange 66. Members 58 and 60 along with square end 62 of core 54 may be of other configurations that are known to those skilled in the art and for simplicity will hereafter be referred to as means for securing one end of the shaft 42 to the respective pulley or fan. As illustrated, shaft 42 approaches the fan securing means at an angle approximately 15 degrees relative to the rotational axis of shaft 64.

As a result of the given location of the flexible shaft in the engine compartment 16 relative to the other components located therein, applicant has provided a smooth continuous path for the flexible shaft thereby creating an arrangement which will have minimal frictional binding between casing 52 and core 54. This will result in the maximum transfer of rotational energy from pulley 36 to fan 32 and provide a workable, inexpensive, simple arrangement for providing substantial horsepower from engine 18 to fan 32. These results have been accomplished by connecting one end of flexible shaft 42 to the rearward portion of pulley 36 and extending the shaft from said connection rearwardly of crankshaft axis 48—48 of engine 18 transverse to the longitudinal axis of vehicle 10 and then curving the flexible shaft 42 into the fan securing means at shroud 30 for securement and eventual rotation of fan 32. It is to this location and configuration of the flexible shaft and its interrelationship to the corresponding engine parts to which the claims are directed.

FIG. 4 is generally similar to FIG. 1 with corresponding parts being indicated by the numerals of FIG. 1 plus 100. End 144 of flexible shaft 142 is secured for rotation to the rear end of any convenient belt driven accessory, such as alternator 178. Alternator 178 is in turn driven by belt 138 which is rotated by crankshaft pulley 140. The alternator may be a standard automobile alternator with appropriate modification to its armature shaft for connection to core 154 of shaft 142 in a manner similar to that of the connection of core 54 to shaft 64 in FIGS. 2 and 3. End 146 of shaft 142 is connected to a gear box 180 which in turn is used to rotate cooling fan 132. It is common practice to rotate the shaft of alternator 178 at a relatively high revolution per minute compared to that of the crankshaft of engine 118. Accordingly, it becomes desirable to reduce the high rotational speed of core 154 of shaft 142 in gear box 180 to thereby reduce the rotational speed of cooling fan 132. In the event that an accessory such as a power steering pump, an air pump, or a vacuum pump as used in a diesel engine, were employed in place of alternator 178 to drive core 154 it may be possible to eliminate gear box 180. The determining criteria of the presence or absence of gear box 180 is dependent upon the rotational speed of core 154 and the desired rotational speed of fan 132 to achieve desired cooling of radiator 128.

Figure 5:
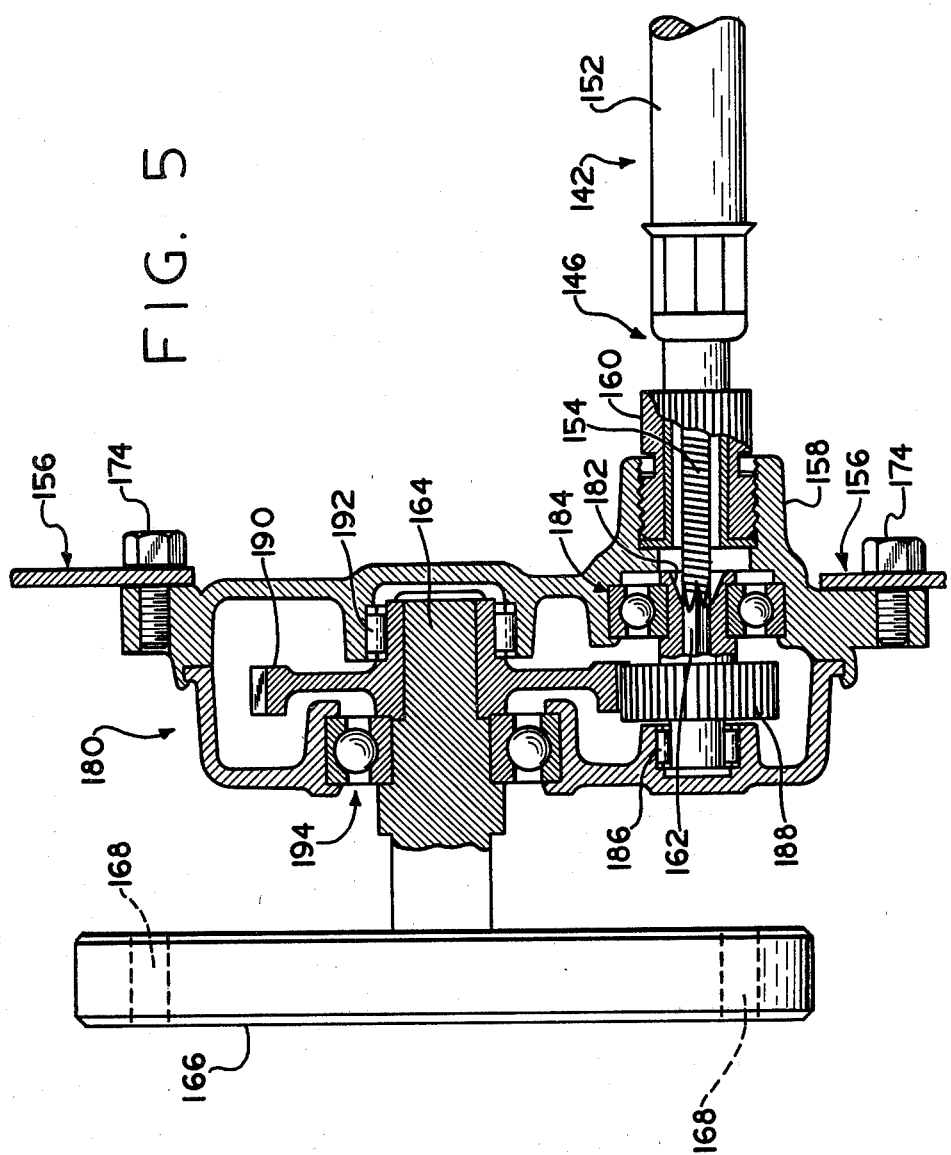
FIG. 5 is an enlarged cross sectional view of a gear box interposed between the flexible shaft and the cooling fan of FIG. 4.

Gear box 180 is shown in greater detail in FIG. 5 and includes an input shaft 182 driven by end 162 of core 154 in a manner similar to that illustrated in FIGS. 2 and 3. Shaft 182 is mounted in a pair of axially spaced bearings 184 and 186 and includes a spur gear 188 having teeth engaged with teeth of a larger spur gear 190. It should also be appreciated that in the event that core 154 is rotating at a speed below that desired, a gear box 180 may be used to increase the rotational speed of fan 132 relative to core 154 by interposing gears 188 and 190 in their illustrated locations. Gear 190 is supported by shaft 164 which is mounted for rotation by a pair of axially spaced bearings 192 and 194. Shaft 164 includes a flange portion 166 having a plurality of openings 168 for the mounting of a cooling fan 132 or cooling fan drive mechanism. Securing means 158 and 160 are used to retain shaft 142 relative to the housing of gear box 180. A plurality of bolts 174 secure gear box to fan shroud 130 via bracket 156. The remaining construction of gear box 180 is in accordance with standard gear box design and construction.

What is claimed is:

1. A cooling system for cooling a vehicle having a longitudinally extending axis, a front end facing in the direction of vehicle movement along said longitudinal axis, a rear end relative to said longitudinal axis, a pair of wheels at said front end rotatable about an axis traversing said longitudinal axis, and an engine located within said front end of said vehicle and having a crankshaft rotatable about an axis traversing said longitudinal axis, said engine having a front end facing one of said wheels and a rear end facing the other of said wheels along said crankshaft axis, and a radiator traverse to said longitudinal axis and located forwardly of said engine in said front end of said vehicle, the improvement comprising:
   (a) a pulley located at said front end of said engine and driven by said crankshaft, said pulley having a front end located in the direction of said front end of said engine and a rear end located in the direction of said rear end of said engine along an axis substantially parallel to said crankshaft axis;
   (b) a propeller type cooling fan located juxtaposition said radiator for moving air through said radiator along said longitudinal axis;
   (c) a flexible shaft terminating at a pair of ends and extending a distance from said pulley at a location rearwardly of said crankshaft axis along a line traverse to said longitudinal axis and then bending along a curve and extending a distance toward said fan;
   (d) means securing one end of said shaft at the rear end of said pulley for rotation of said shaft with said pulley; and
   (e) means securing the other end of said shaft with said fan for rotating said fan.

2. A cooling system according to claim 1 wherein said pulley rotates an accessory of said vehicle secured to the rear end of said pulley and said shaft is rotated by said accessory.

3. A cooling system according to claim 1 or 2 wherein said fan securing means includes a gear box to proportionally increase or decrease the rotation speed of said shaft.

4. A cooling system according to claim 1 wherein said shaft extends traverse to said longitudinal axis a distance substantially the length of said engine.

5. A cooling system for cooling a vehicle having a longitudinally extending axis, a front end facing in the direction of vehicle movement along said longitudinal axis, a rear end relative to said longitudinal axis, a pair of wheels at said front end rotatable about an axis traversing said longitudinal axis, and an engine located within said front end of said vehicle and having a crankshaft rotatable about an axis traversing said longitudinal axis, said engine having a front end facing one of said wheels and a rear end facing the other of said wheels along said crankshaft axis, and a radiator traverse to said longitudinal axis and located forwardly of said engine in said front end of said vehicle, the improvement comprising:
   (a) a pulley located at said front end of said engine and driven by said crankshaft, said pulley having a front end located in the direction of said front end of said engine and a rear end located in the direction of said rear end of said engine along an axis substantially parallel to said axis of said engine;

(b) a propeller type cooling fan located juxtaposition said radiator for moving air through said radiator along said longitudinal axis;

(c) a flexible core terminating at a pair of ends and extending a distance from said pulley at a location rearwardly of said crankshaft along a line traverse to said longitudinal axis and then bending along a curve and extending a distance toward said fan;

(d) means securing one end of said core at the rear end of said pulley for rotation of said core with said pulley;

(e) means securing the other end of said core with said fan for rotating said fan; and (f) a flexible casing encircling said core and supporting said core for rotation substantially throughout the length of said core, said casing being secured at one end juxtaposition said pulley and at the other end juxtaposition said fan and being fixed against rotation relative to said vehicle.

6. A cooling system according to claim 5 wherein said pulley rotates an accessory of said vehicle secured to the rear end of said pulley and said core is rotated by said accessory.

7. A cooling system according to claim 5 or 6 wherein said fan securing means includes a gear box to proportionally increase or decrease the rotation of said core.

8. A cooling system according to claim 5 wherein said core extends traverse to said longitudinal axis a distance substantially the length of said engine.

* * * * *